United States Patent [19]

Wagener et al.

[11] 4,246,071
[45] Jan. 20, 1981

[54] PROCESS FOR THE RECOVERY OF COKE OVEN WASTE HEAT

[75] Inventors: Dietrich Wagener; Claus Flockenhaus, both of Essen; Joachim F. Meckel, Heiligenhaus, all of Fed. Rep. of Germany

[73] Assignee: Didier Engineering GmbH, Essen, Fed. Rep. of Germany

[21] Appl. No.: 30,358

[22] Filed: Apr. 16, 1979

[30] Foreign Application Priority Data

Apr. 15, 1978 [DE] Fed. Rep. of Germany ....... 2816476

[51] Int. Cl.³ ...................... C10B 39/02; C10B 21/02; C10B 57/10
[52] U.S. Cl. .................................... 201/39; 201/14; 201/41; 202/133; 202/150; 202/228
[58] Field of Search ................ 202/150, 151, 95, 133, 202/227, 228; 201/39, 14, 27, 26, 13, 41

[56] References Cited

U.S. PATENT DOCUMENTS

| | | | |
|---|---|---|---|
| 1,827,483 | 10/1931 | Parr et al. | 202/150 |
| 2,448,223 | 8/1948 | Lantz | 201/27 X |
| 2,746,914 | 5/1956 | Van Ackeren | 202/151 X |
| 2,757,129 | 7/1956 | Reeves et al. | 201/27 |
| 3,434,932 | 3/1969 | Mansfield | 201/27 |
| 3,470,275 | 9/1969 | Ban | 201/27 |
| 4,053,364 | 10/1977 | Poersch et al. | 201/39 X |
| 4,061,544 | 12/1977 | Van Ackeren et al. | 202/151 X |

*Primary Examiner*—Frank W. Lutter
*Assistant Examiner*—Roger F. Phillips
*Attorney, Agent, or Firm*—Wood, Herron & Evans

[57] ABSTRACT

This invention is directed to a process for making coke and recovering the heat therefrom for preheating the firing gas to the coke oven. The process involves the use of the coke oven firing gas to extract the sensible heat from the hot coke from the coking oven to both preheat the firing gas for the coke oven and cool the hot coke. Significant economies are achieved in the two-fold function of coke production and heat recovery in accordance with the method disclosed.

10 Claims, 1 Drawing Figure

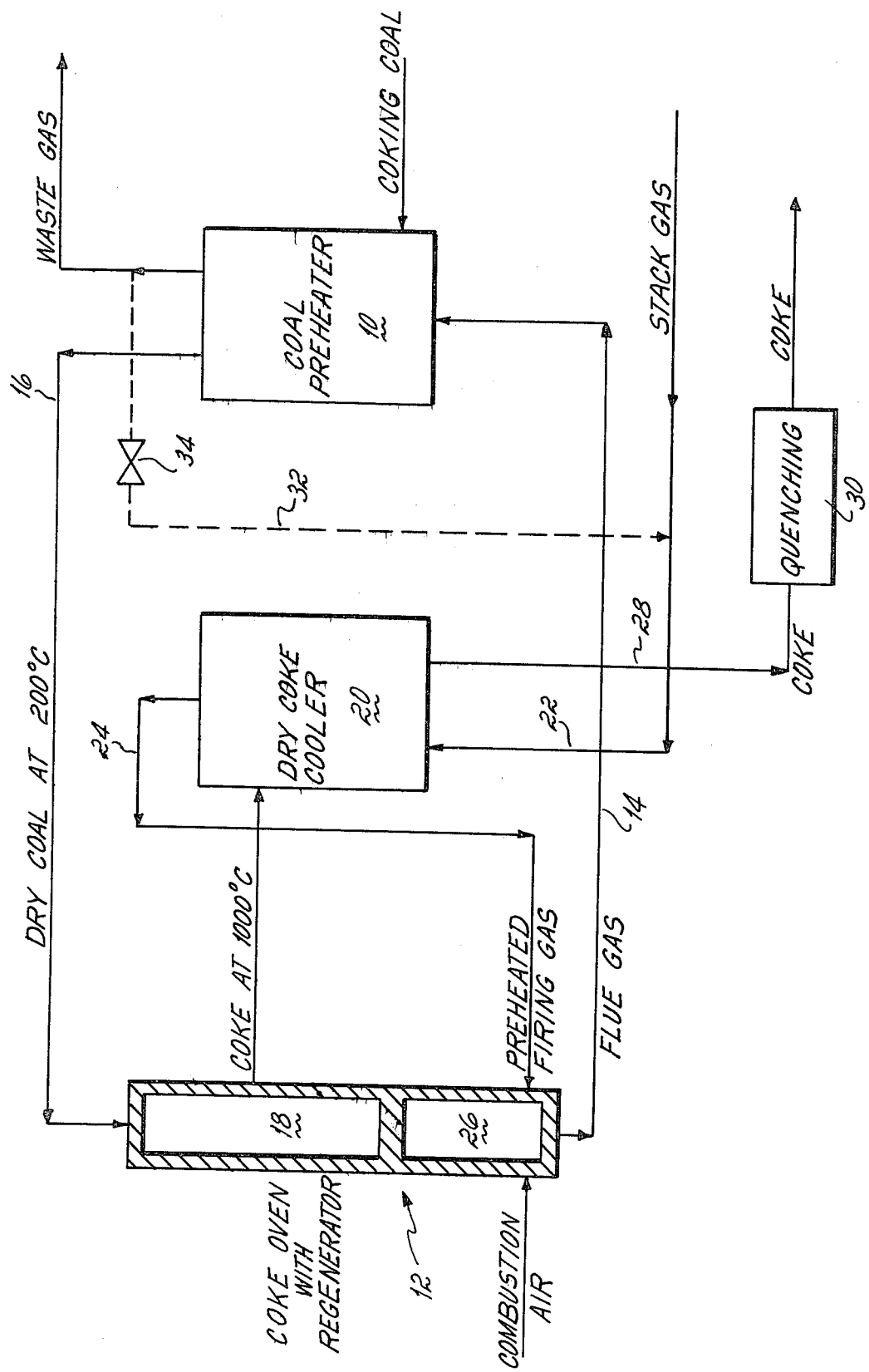

PROCESS FOR THE RECOVERY OF COKE OVEN WASTE HEAT

BACKGROUND OF THE INVENTION

This invention relates to a process for making coke from coal and, more particularly, to the recovery of coke oven waste heat in a complete coke production process.

In conventional coke production processes, coking coal is fed into coke ovens where it is heated in the absence of air to transform the coal to coke. Coking ovens typically include a regenerator chamber below the oven where combustion air is heated prior to being mixed with the firing gas used to heat the coke ovens. On completion of the coking process, the hot coke which is at a temperature of about 1000° C. is removed from the oven and taken to a quenching tower where it is sprayed with water to cool it.

The hot coke coming from the coking ovens has a significant quantity of sensible heat. Processes are known for utilizing that sensible heat. For example, in German Pat. Nos. 24 34 872 and 24 15 758, there are disclosed processes wherein the hot coke is cooled and the sensible heat of the hot coke is used either directly or indirectly to dry and/or preheat the coking coal charge.

SUMMARY OF THE INVENTION

It is among the principal objects of this invention to provide a more economical recovery of the sensible heat of the hot coke.

This invention consists of a unique method of coke production and heat recovery therefrom. The invention provides a more economical recovery of the sensible heat of the hot coke than has heretofore been available. In accordance with the principles of this invention, the sensible heat of the hot coke is extracted by the firing gas used to heat the coke ovens and that heat is used to heat the firing gas prior to is introduction into the coke ovens.

In accordance with the process of this invention, the hot coke taken from the coking oven is fed to a dry coke cooler. In the dry coke cooler, the bottom firing gas for the coking ovens is passed either directly or indirectly through the hot coke. The bottom firing gas thus extracts the sensible heat from the hot coke in the cooler which preheats the firing gas for its introduction into the coke oven. At the same time, the firing gas passing through the dry cooler serves to cool the hot coke. The process of this invention makes it possible to design the regenerator of the coke oven considerably smaller than usual since it is required only for preheating the combustion air, the firing gas having already been preheated by the heat of the hot coke in the dry coke cooler.

It has also been found that the sensible heat of the hot coke is always greater than that required for preheating the firing gas. Therefore, depending on the loads, the firing gas can always be preheated to a desired temperature of at least about 900° C. The temperature of the coke taken from the dry coke cooler will then vary. However, these temperature variations are of little significance in the process since the dry coke is then taken to a quenching tower where such variations can be easily accommodated. It is also possible to heat the firing gas in the dry coke cooler to a temperature greater than that necessary for preheating the firing gas making it possible to use the excess heat contained in the firing gas for heating the combustion air for the coke oven. This makes it possible to design the regenerator even smaller.

In accordance with a presently preferred form of this invention, coking coal is fed to a coal preheater where it is heated to a temperature in the range of about 150° to 250° C. The heat for the coal preheater is supplied by the flue gas from the coke oven as is known in the art. The dry heated coal is then fed to the coke oven. The oven is heated by a mixture of combustion air which is heated in the regenerator portion of the coke oven and the firing gas. The hot coke is then taken from the coke oven at a temperature of about 1000° C. and is transferred to a dry coke cooler. In the dry coke cooler, the firing gas used to heat the coke oven is passed therethrough to extract the sensible heat from the dry hot coke. The firing gas exits the coke cooler and is fed to the coke oven where it is mixed with the combustion air heated in the regenerator to fire the oven. The dry coke from the coke cooler is then taken to a quenching tower where it is sprayed with water to cool it.

If the firing gas employed in the process is inert with respect to the hot coke, it can be passed directly through and over the hot coke thereby eliminating any equipment requirements for primary and secondary gas circulation thus reducing equipment costs.

BRIEF DESCRIPTION OF THE DRAWING

Other objects and advantages of this invention will become apparent from the detailed description of the invention taken with the accompanying drawing which is a schematic flow diagram illustrating the process of this invention.

DETAILED DESCRIPTION OF THE INVENTION

Referring to the attached drawing, the coking coal which is at ambient temperature is fed to a coal preheater 10. The coal preheater is preferably heated by flue gas from the coke oven 12 via the line 14. In the coal preheater 10, the coking coal is dried and discharged via path 16 at a temperature in the range of 150° to 250° C., preferably about 200° C. The dry coal is then fed into the oven portion 18 of the coke oven 12. After the coal has been in the oven 12 a sufficient time to convert it to coke, it is removed from the oven and passed to a dry coke cooler 20.

The coke taken from the coke oven 12 is at a temperature of about 1000° C. The firing gas for the coke oven enters the dry coke cooler 20 via line 22 where it is heated by the sensible heat of the hot coke. In a presently preferred form of the invention, the firing gas is blast furnace stack gas. The use of blast furnace stack gas is particularly advantageous, first because it is readily available at any steel mill, and second because it is substantially inert with respect to the dry coke. Therefore, it can be passed directly through and over the hot coke without igniting. If a non-inert firing gas is used secondary heat transfer equipment for circulating the firing gas through the cooler 20 to extract the sensible heat of the hot coke without directly contacting the coke is required. Thus, the use of blast furnace stack gas provides an optimum process.

The firing gas exits the dry coke cooler 20 via line 24 and is then fed to the bottom of the coke oven 12. Combustion air enters the regenerator section 26 of the coke oven where it is heated and thereafter mixed with the preheated firing gas. Since the firing gas has been preheated, the combustion air is not required to heat the firing gas thus making it possible to reduce the size of the regenerator of the coke oven. In addition, since this process permits the use of a smaller regenerator, the flue gas leaving the coke oven via line 14 is at a higher temperature than usual. Thus, this high temperature flue gas may advantageously be utilized for drying and preheating the coking coal to make full use of all of the waste heat from the coking oven.

The coke in the dry coke cooler 20 is cooled by the firing or stack gas passing therethrough. As stated above, the extracted sensible heat heats the firing gas prior to its introduction into the coke oven 12. The coke is then removed from the cooler 20 and is transferred to a quenching station via path 28, for example, a quenching tower 30 where it is sprayed with water to cool it below ignition temperature. After quenching, the coke may be sorted and transferred for storage or use in accordance with conventional applications.

In one alternative embodiment of the invention, a portion of the waste gas from the coal preheater 10 is mixed with the stack gas prior to its passing through the dry coke cooler 20. This is accomplished by passing the waste gas through a line 32 to mix it with the stack gas before the gas is fed to the dry coke cooler. A valve 34 is placed in line to selectively control the use of the waste gas as desired. By mixing the waste gas with the stack gas, the composition and combustion value of the firing gas may be controlled.

We claim:

1. A process for the recovery of waste heat from a coking oven comprising the step of passing the firing gas for the coking oven into direct contact with the hot coke from the coking oven to extract sensible heat from the hot coke to thereby cool the hot coke and to heat the firing gas prior to its introduction into the coking oven, said firing gas being inert with respect to the hot coke.

2. The process of claim 1 wherein the firing gas is blast furnace stack gas.

3. The process of claim 1 wherein said firing gas is heated to a temperature of at least about 900° C.

4. The process of claim 1 including the additional step of passing the flue gas from the coking oven into heat transfer relation with the coking coal before its introduction into the coking oven to dry and preheat the coal.

5. The process of claim 4 wherein the coking coal is preheated to a temperature in the range of about 150° to 250° C.

6. In a process for making coke including the steps of feeding coking coal to a coking oven wherein the oven is heated by a mixture of firing gas and combustion air, removing the hot coke from the coking oven, and feeding the hot coke to a coke cooler, the improvement comprising passing the firing gas for the coking oven into direct contact with the hot coke in the coke cooler to thereby cool the coke and to heat the firing gas prior to its introduction into the coking oven, said firing gas being inert with respect to the hot coke.

7. The process of claim 6 including the additional step of preheating the coking coal with the flue gas from the coking oven.

8. The process of claim 7 wherein waste gas from the coking coal preheating step is mixed with the firing gas prior to passing the firing gas into heat transfer relation with the hot coke.

9. The process of claim 7 wherein the coking coal is heated to a temperature in the range of about 150° to 250° C. and the firing gas is heated at a temperature of at least about 900° C.

10. The process of claim 6 wherein the firing gas is blast furnace stack gas.

* * * * *